Patented Aug. 24, 1937

2,091,184

UNITED STATES PATENT OFFICE 2,091,184

FLEXIBLE ABRASIVES AND METHOD OF MAKING

Theodor Pohl, Frankfort-on-the-Main, and Josef Schneider, Oberursel, Germany, assignors to Deutsche Gold und Silver Scheideanstalt vormals Roessler, Frankfort-on-the-Main, Germany, a corporation of Germany No Drawing. Application August 8, 1934, Serial No. 739,002. In Germany August 9, 1933

1 Claim. (Cl. 51—278)

This application relates to flexible abrasives such as cloth, paper or the like, which contain an abrading material.

More particularly this application is concerned with flexible abrasives in which the abrasive material is held together by means of rubber or substances similar to rubber such as balata. The abrasive cloth, paper or the like, is bound together and held to a base so that the coating containing the abrasive grains possesses a porous, spongy structure.

For the preparation of products of this kind it is advantageous to use aqueous rubber dispersions such as natural rubber milk (latex) or concentrates of this type. The dispersions or suspensions of rubber may also contain vulcanization media and if necessary, vulcanization accelerators, or they may be employed in the natural unvulcanized state. Products which have already undergone more or less complete coagulation may also be used or may be combined with other rubber-containing dispersions.

For converting the binding agent or the mixture of binding material and abrasive material to the desired porous, cellular, or spongy structure, certain media may be used. The binding agent or the mixture of binding agent and abrasive material, which may or may not also contain other substances, may have incorporated therein gas-evolving materials and also, if necessary, substances which control gas evolution. Thus, as the gummy layer begins to coagulate gas evolution may be stopped. In this way by the development of gas in the structure a porous or cellular flexible abrasive material having a spongy texture is formed. As an example of a specific gas-evolving material, ammonium carbonate may be added to the latex or latex concentrate in suitable amounts and this is decomposed during the later vulcanization.

However, as gas-liberating media to evolve gas and consequently convert the mixture of binding agent and abrasive material into a porous and cellular structure, it is preferred to use substances which contain active oxygen. Among these substances, hydrogen peroxide, which readily evolves oxygen, is to be preferred. By adding substances which catalyze or control gas evolution, such as the familiar decomposition catalyst pyrolusite, manganese dioxide, one can regulate the amount of gas evolution thereby controlling the size of the bubbles as well as the duration of gas evolution. In this way a product of desired porosity can be obtained.

As further materials which may be added to the mixture of binding agent, abrasive material, and gas-evolving medium, may be mentioned those which possess a special action such as substances which cause or bring about an acceleration of the solidifying action or an increase in solidity. Examples of these materials are finely divided quartz, chalk, spar, magnesia, etc.

The base material is composed of any suitable substance such as paper, textile tissues, linen, metal foil, sheets of cellulose derivatives, sheets of artificial leather, or any other sheet material. If necessary, the base may be treated preliminarily as, for example, by the application of a thin non-porous layer of rubber on which the porous layer containing the abrasive grains or abrasive media is brought in contact.

As a specific example of the novel process and product may be given the following:

Example 120 grams of a vulcanized latex concentrate in the liquid state with a rubber content of about 75% is taken as the starting material. Into this is stirred a mixture of 120 grams of ground quartz and 150 grams of silicon carbide (No. 150). To this mixture is added, with continued stirring, 6 cc. of a solution of 30% hydrogen peroxide and 0.15 gram of manganese dioxide suspended in 3 cc. of water. The resulting mass, which already starting to react, is poured or spread out on a flexible base material as rapidly as possible. The product is then dried and, if necessary, subjected to a further solidifying treatment as for example by the application of heat.

It is apparent that an advantage of this process in the preparation of the product resides in the fact that the porous or spongy rubber containing material coagulates very rapidly and can be dried as quickly as a non-porous layer. The method of preparation accordingly takes considerably less time than was formerly necessary.

The products prepared by this method are, moreover, much more satisfactory than those having thick layers of abrasive grains. They have a strong abrading action on the treated material and can be used to special advantage in grinding difficult objects. Abrasive papers prepared in this manner are especially adapted for treating materials which normally smear and/or obstruct the abrasive surfaces.

While rubber sponges containing abrasive grains may have been suggested in the past, satisfactory products having sufficient resistance to abrading and cracking have not been prepared.

The especial advantages of using an active oxygen yielding material such as hydrogen peroxide to obtain the desired porous structure are that it can be incorporated in the mixture of abrasive material and rubber milk without difficulty and the rate of oxygen evolution can be readily controlled. Too violent an evolution of oxygen may be avoided by the addition of substances such as decomposition or control catalysts, of which pyrolusite, manganese dioxide, is a familiar example.

It is a fact that the porous rubber articles containing abrasive grains prepared by the method disclosed are considerably more resistant and are not easily cracked. They are characterized by special effectiveness as well as greater strength.

We claim:

A method for preparing flexible abrasives which comprises the steps of admixing an abrasive material and a rubber dispersion, adding thereto as additional substances fillers, vulcanizers, and vulcanization accelerators, incorporating therein a gas evolving substance, incorporating therein a decomposition catalyst for catalyzing gas evolution from said gas evolving substance and securing this mixture to a suitable flexible base material.

THEODOR POHL.
JOSEF SCHNEIDER.